United States Patent
Bruls et al.

(10) Patent No.: US 6,999,515 B2
(45) Date of Patent: Feb. 14, 2006

(54) ENCODING BLOCK-ORGANIZED DATA

(75) Inventors: Wilhelmus H. A. Bruls, Eindhoven (NL); Reinier B. M. Klein Gunnewiek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 502 days.

(21) Appl. No.: 10/146,399

(22) Filed: May 16, 2002

(65) Prior Publication Data

US 2002/0136300 A1    Sep. 26, 2002

Related U.S. Application Data

(63) Continuation of application No. 09/315,081, filed on May 19, 1999, now Pat. No. 6,498,812.

(30) Foreign Application Priority Data

May 20, 1998    (EP)    ................................. 98201685

(51) Int. Cl.
*H04B 1/66*    (2006.01)

(52) U.S. Cl. .......................... 375/240.24; 375/240.05; 375/240.07; 375/240.12; 375/240.02; 375/240.03; 375/240.16; 382/251; 382/248; 382/250; 348/699

(58) Field of Classification Search ........... 375/240.24, 375/240, 240.12, 240.03, 240.02, 240.05, 375/240.07, 240.16; 382/240, 248, 166, 382/253, 251, 250; 348/416, 699, 419, 420
See application file for complete search history.

(56) References Cited

U.S. PATENT DOCUMENTS

| | | | | |
|---|---|---|---|---|
| 4,849,810 A | * | 7/1989 | Ericsson ................. | 375/240.12 |
| 5,719,630 A | * | 2/1998 | Senda .................... | 375/240.17 |
| 6,005,981 A | * | 12/1999 | Ng et al. .................... | 382/240 |
| 6,040,861 A | * | 3/2000 | Boroczky et al. ....... | 375/240.12 |
| 6,219,089 B1 | * | 4/2001 | Driscoll, Jr. et al. .......... | 348/36 |
| 6,498,812 B1 | * | 12/2002 | Bruls et al. .................. | 375/240 |

* cited by examiner

*Primary Examiner*—Shawn S An

(57) ABSTRACT

An information stream organized as a sequence of blocks is encoded according to a graceful degradation principle. The stream poses temporal non-uniform data processing requirements. In particular, with respect to a received block one or more blockwise defined control parameters and an associated blockwise processing load are detected (44). Under control (46) of a processing load for one or more previous blocks, one or more later blocks before processing thereof get an adjustment (48) of one or more of the control parameters. This lowers an expected load for the later block in case of an excessive load, and vice versa when detecting a sub-standard load.

1 Claim, 3 Drawing Sheets

ENCODING BLOCK-ORGANIZED DATA

This is a continuation of application Ser. No. 09/315,081, filed May 19, 1999 is now U.S. Pat. No. 6,498,812.

FIELD OF THE INVENTION

The invention relates to encoding block-organized audio/video data.

BACKGROUND OF THE INVENTION

The processing of digital audio and video, such as for transmission or for storage, has necessitated the use of various data compression technologies. A non-limiting example is the MPEG standard, that has various versions for audio as well as for video. Another standard is H.261. Realizing such compression in software has been disclosed in Ho-Chao Huang et al, New Generation of Real-Time Software-Based Video Codec: Popular Video Coder II, IEEE TR. Cons.El. Vol. 42, No. 4, P.963–973. It is feasible to have compression and similar operations executed in a mixed software and hardware environment. The number of operations necessary for software encoding is difficult to predict. An embodiment hereinafter will be mainly described with reference to video. Now, generally the compression is executed on the basis of Groups of Pictures (GOPs). Hereinafter, the term "picture" will be used consistently. Depending on the actual video standard, the term "picture" may mean "frame" as well as "field". Now, the compression of framewise organized audio or mixed audio/video information streams may be effected in similar manner. Such processing must be done in real-time, and a high penalty must be paid in case of processor overload, by loosing pictures or parts thereof. Graceful degradation has been widely used in data processing, by surrendering a certain degree of quality in order to preserve basic system facilities.

SUMMARY TO THE INVENTION

In consequence, amongst other things, it is an object of the present invention to provide an improved encoding method. Now therefore, according to one of its aspects the invention is characterized as recited in the characterizing part of Claim 1. The invention also relates to an encoder device arranged for implementing the above method. Further advantageous aspects of the invention are recited in dependent Claims.

The inventors have recognized the potential value of various control parameters that are defined over a picture or a part of a picture, such as a slice, for controlling the actual processing load. A suitable parameter for video is a redundancy quantity Q that indicates an amount of information to be treated as inconsequential within a block or within an overall picture. According to a primary aspect of the invention, an actual processing load is used to predict future processing load, and in consequence, to adjust one or more control parameters for avoiding overload-inflicted losses of information.

These and further aspects and advantages of the invention will be discussed more in detail hereinafter with reference to the disclosure of preferred embodiments.

DETAILED DESCRIPTION OF PREFERRED EMBODIMENTS

Figure 1:
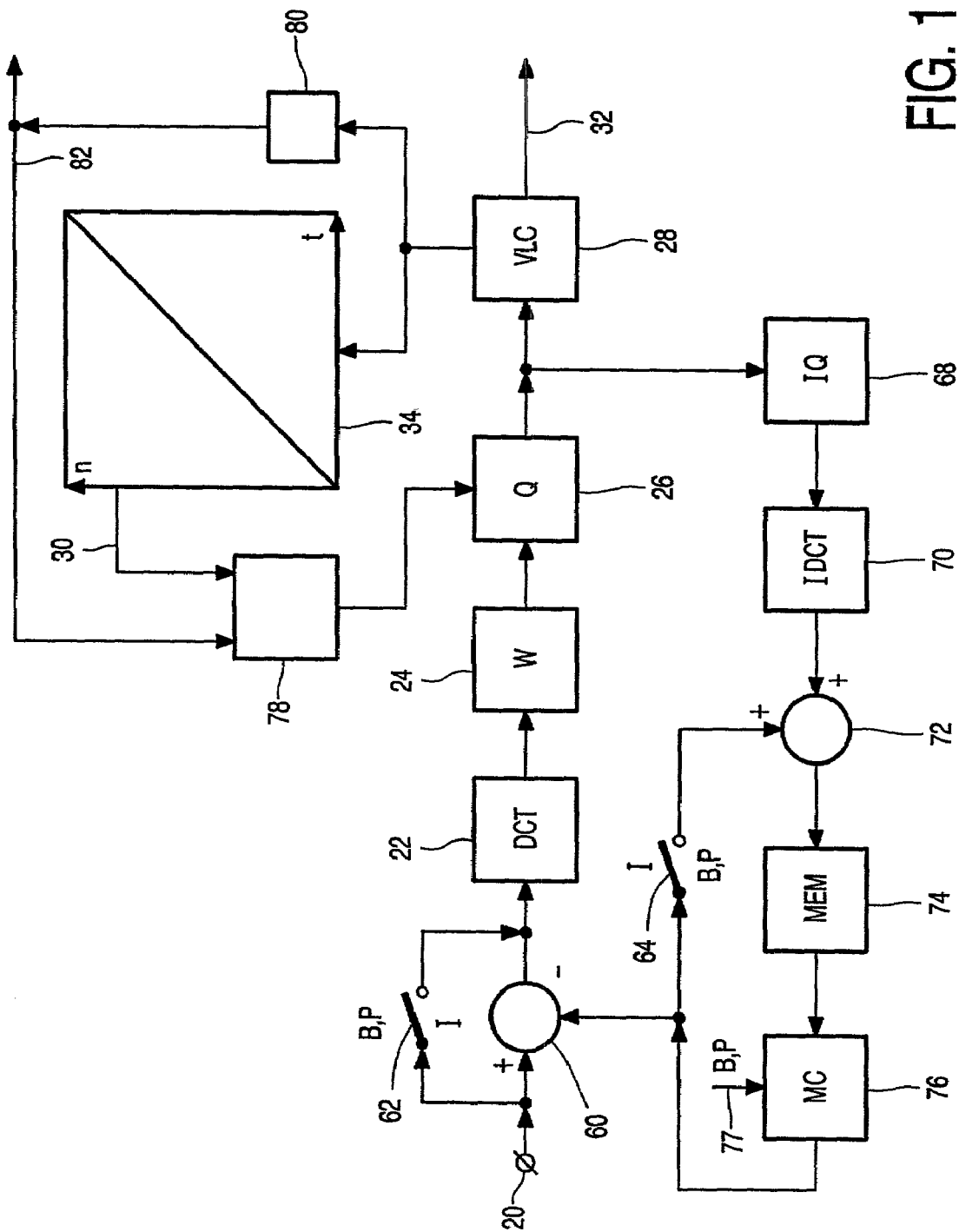
FIG. 1 shows a block diagram of an inventive apparatus.

FIG. 1 is a block diagram of an apparatus according to the invention, in particular for use with video. First, a simplified version is discussed, wherein elements 62, 64, 68, 70, 72, 74, 76, 78, 80, have been left out. The video received on input 20 is organized in pictures that have uniform numbers of pixels. In DCT element 22, each picture is divided into a series of video blocks that are each composed from an array of 8×8 pixels. An intermediate division of the image is into slices, that consist of two adjacent horizontal rows of blocks. Each block is now subjected to a Discrete Cosine Transform to produce an array of 8×8 digital frequency coefficients.

In a two-dimensional DCT result block, each coefficient relates to a wave frequency. The upper-left coefficient "00" relates to an average value corresponding to zero spatial frequency along both co-ordinates. To the right of this position, waviness is horizontal. Below the first position the waviness is vertical. In slanted directions, the waviness is oriented in corresponding fashion with respect to the co-ordinate directions. Subsequent decoding by an inverse Discrete Cosine Transform will give a lossless reconstruction of the original image.

In FIG. 1, weighting element 24 introduces weighting factors for the respective coefficients, taking into account the relatively lower sensitivity of human perception for smaller details or higher spatial frequencies. The object of this weighting is data reduction. The weighting factor for coefficient "00" is 1. The weighting factors decrease in all directions away from coefficient "00". The weighting factors are in general fixed. In a decoder, this technique will cause some loss of information, that is substantially invisible to a human person, even under favorable viewing conditions.

In quantifier 26, for further data reduction, the coefficients, apart from coefficient 00, are divided by a redundancy factor Q that is uniform for the video block in question, or even for a series of video blocks such as a slice, or for a whole video picture. The quotients are subsequently clipped with respect to a uniform threshold value: this will cause dropping coefficients that are not larger than the threshold. The processor load for encoding that uses software applies to elements 26, 28 in FIG. 1, and may be mapped onto a single high-performance microprocessor such as an INTEL Pentium. Q-value and processor load are about inversely proportional to each other.

Finally, in coder 28 the resulting coefficients are serialized and subjected to Variable Length Encoding according to a Huffmann or similar type of code. The resulting bitstream is outputted on output 32. In computing element 34 the actual processing load is calculated, and retrocoupled along line 30 to quantifier 26. The latter may adjust the value of Q to retain the processing load per block or per picture in an allowable range.

In the above, the number of clock cycles depends on the image content. Differences may occur between various pictures, as well as between slices or between blocks within a single picture. A requirement to cope with worst case conditions will therefore cause overdimensioning of the hardware facilities. The invention has recognized that the amount of processing may furthermore depend on the factor Q and on other control parameters. It has been proposed to adjust Q for controlling channel bitrate and buffer occupancies. The invention allows to adjust processor load through adjusting Q and possibly other control parameters.

Figure 4:
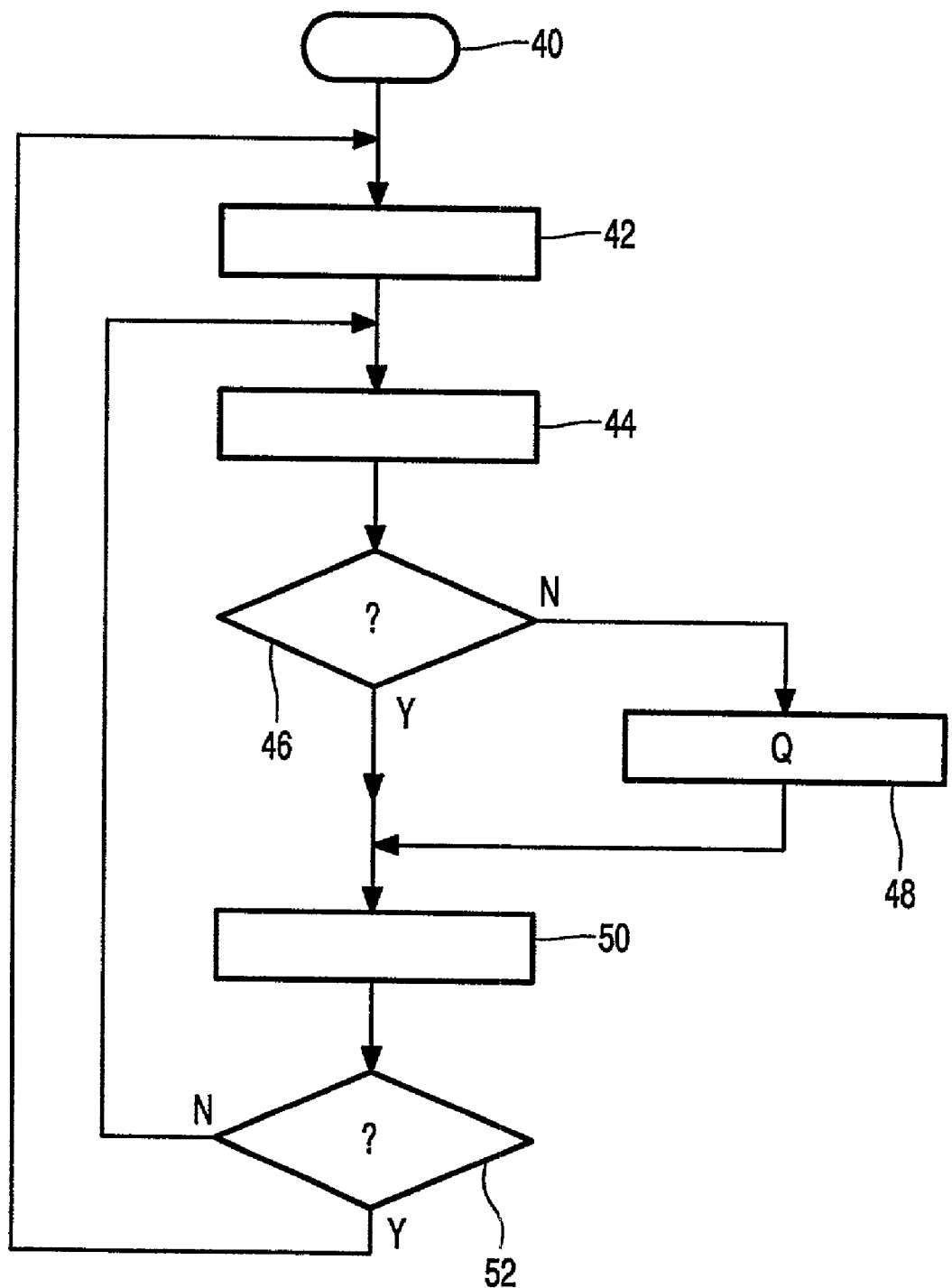
FIG. 4 shows a policy flowchart.

A policy to be followed has been shown in the flow graph of FIG. 4. In block 40, processing is started and necessary hardware and software facilities are organized and initialized. In block 42 processing begins for a new picture that comprises a sequence of video blocks. In block 44 an actual progress quantity is updated. For example, a video block count or a video line count is updated in accordance with the configuration of the various video blocks within the picture in question, and also the advance of time within the time interval that has been assigned to the picture in question. Block 46 checks whether the progress is in a prescribed range. Initially it is supposed that progress should be linear in time, but along a sequence of pictures, the progress within each picture may be non-linear. Also, the progress profile may be non-uniform along the sequence. If progress is within range, in block 50 a next video block is processed. The range may need continual updating along a sequence of video blocks and/or pictures. In block 52 it is checked whether it is actually the last video block of the picture in question. As long as it is not the last one, the system reverts to block 44. If it is the last video block, in block 42 the next picture is started. If the result in block 46 is negative however, in block 48 the quantity Q is updated, which immediately will influence the processing load, and therefore, also subsequent progress to be checked in block 46.

Figure 2:
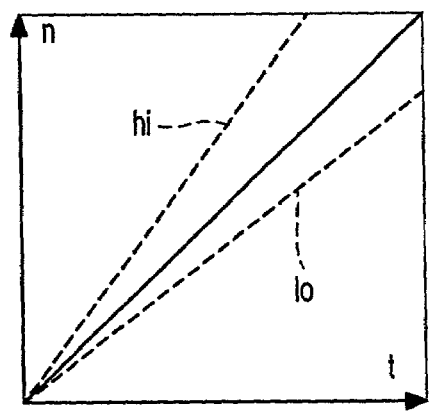
FIG. 2 shows a first advance profile chart.

In this respect, FIG. 2 shows a first advance profile chart, in particular a linear one. The drawn line indicates nominal progress, which indicates that all blocks take substantially equal time intervals for being processed. Lines high and low indicate the upper and lower thresholds, respectively, that are taken into account for updating the actual value of Q. If processing is too slow, progress remains below the drawn line, so that Q must be raised, and vice versa. If the decision is only taken on the basis of a picture as a whole, only the intercept with the upper edge of the Figure is taken into account. The lines hi and lo have appreciable divergences from the nominal line, to avoid all too frequent amending of Q. The system should always be designed and controlled in such manner that a certain surplus capacity remains, such as 20% or the like, to cope with unexpected events.

Figure 3:
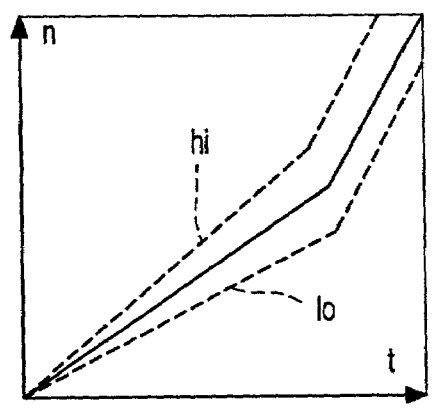
FIG. 3 shows a second advance profile chart.

FIG. 3 shows a second advance profile chart, that is non-linear: the present case illustrates that earlier blocks of the picture took more processing time than later blocks. This has been concluded from earlier pictures of the sequence, and may be caused by a non-uniform picture content in the earlier blocks: a uniform image part will take less processing than a scene part with much detail. Between successive pictures, both the slopes of the profile, and also the position of the edge in the profile are retained. Such non-uniformity within a picture may cause a different policy in quantifying the changes in Q and/or other control parameters. In general, the quantifying of changing Q is a problem of cybernetics; instability should be avoided. Often the adjustment takes more than one picture to fully settle down, in that amending steps would be on the smaller side. Also, the time-response for measures taken on a whole picture could be different from measures taken on a block-to-block basis.

Figure 5:
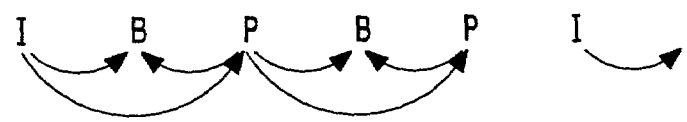
FIG. 5 shows an exemplary MPEG organization.

The invention may, by way of example, be used in an MPEG environment. Now, FIG. 5 shows an exemplary MPEG organization as expressed in a sequence of pictures. MPEG has three categories: I, B, and P pictures. I pictures contain all information to reproduce the image in question. P pictures contain less than all necessary information, but need an already processed picture to be reproduced in such manner that itself may act as predecessor for a picture processed still later. Finally, B pictures contain less than all necessary information, but need one or more already processed pictures to reproduce the image in question; however, such will not result in a picture that itself may act again as predecessor for an image to be processed yet. P pictures may therefore be chained, but B pictures will always be terminal pictures. Coherence has been indicated by arrows.

For an MPEG scheme, FIG. 1 has been extended. In particular, a retrocoupling loop comprises an inverse quantifier 68 that is the opposite of quantifier 26. Further, element 70 executes an Inverse Discrete Cosine Transform as opposite to DCT element 22. The result is forwarded to adder 72 and subsequently stored in memory 74. For B and P pictures, input 77 of element 76 receives one or more motion compensation vectors, so that effectively, motion in the image may be compensated. The resulting picture content is sent to subtractor 60 that is exclusively operative for B and P pictures. For I pictures, switch 62 is closed, and adder 60 is effectively short-circuited. For B and P pictures, the motion-compensated picture is also sent by switch 64 to adder 72 for adding to received pictures from IDCT 70.

Variable length coder 28 outputs the coded information stream on output 32 for storage or transmission. It furthermore signals progress to computing element 34 and can also send information pertaining to output bitrate 32 to bitrate control block 80. The latter will check whether the bitrate as averaged over an applicable time interval will not exceed processing and/or buffering capacities of elements that are downstream from output 32. The result is a control signal that may be outputted alongside with output 32 in a downstream direction, as well as be retrocoupled together with the control signal from computing element 34 to a logic combination element 78. If the bit-rate load is not excessive, computing element 34 is determining. If the bitrate is too high, combination element 78 will overrule the control by computing element 34.

Further amending of control parameters may include the following. In an MPEG stream, B-pictures may be selectively left out. Furthermore, the coefficient clipping in weighting block 24 of FIG. 1 may be executed in a more rigorous, or in a more relaxed manner. Furthermore, the motion estimation may be executed in a less exhaustive manner, such as by taking fewer motion vector candidates, e.g. three instead of five.

Further measures in the context of the present invention are as follows: The load complexity is monitored on the basis of a group of successive pictures (GOP) that all have approximately the same value of Q, and the nature of the various types of picture, such as I, P and B pictures in MPEG is taken into account for assigning respective appropriate levels of Q.

The differential signal between input and compensated input may be forced to zero through coefficient clipping, on the input of DCT element 22, in case the associated have a near-zero difference anyway. This may be signalled through an output signal of a motion estimator device. The calculations in blocks DCT, Q, IQ, and IDCT may then be foregone. A still further measure when nevertheless a particular B or P picture could not be restored, is to take the immediately preceding I picture together with the next following non-I picture, and to divide-by-two the differential vector between the two pictures, so that in fact, an average picture will result.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware.

The invention claimed is:

1. A method of encoding an input signal according to a graceful degradation principle to obtain an information stream, said information stream being organized as a sequence of blocks and poses temporal non-uniform data processing requirements, wherein the method comprises the steps of: determining one or more control parameters and a block-associated processing load; and adjusting by a quantifier one or more of said parameters to one or more later blocks before processing thereof, under control of an actual processing load pertaining to one or more previous blocks; wherein said actual processing load is used to predict a future processing load by retrocoupling a calculation of the actual processing load to the quantifier, and said adujusting step avoids overload-inflicted losses of information in the future processing load, which method further comprises the steps of: checking whether a particular picture can be restored; and in a negative case undertaking to find an averaged picture between an immediately preceding picture and a next-following picture.

* * * * *